United States Patent [19]
Favreau

[11] 3,969,761
[45] July 13, 1976

[54] TRANSMITTER AND RECEIVER CIRCUITS FOR THE SEQUENTIAL STORAGE COLOR TELEVISION SYSTEM

[75] Inventor: Michel Favreau, Paris, France

[73] Assignee: Thomson-CSF, Paris, France

[22] Filed: July 22, 1975

[21] Appl. No.: 598,162

[30] Foreign Application Priority Data
July 26, 1974 · France .............................. 74.26060

[52] U.S. Cl. ...................................................... 358/14
[51] Int. Cl.² .......................................... H01L 9/40
[58] Field of Search ..................................... 358/14

[56] References Cited
UNITED STATES PATENTS

| | | |
|---|---|---|
| 2,870,248 | 1/1959 | Valenton et al. ...................... 358/14 |
| 3,555,174 | 1/1971 | Brunch ................................. 358/18 |
| 3,863,264 | 1/1975 | Nelson et al. ......................... 358/14 |

*Primary Examiner*—Robert L. Griffin
*Assistant Examiner*—Aristotelis M. Psitos
*Attorney, Agent, or Firm*—Cushman, Darby and Cushman

[57] ABSTRACT

The top part of the band occupied by the complete video signal is split into two adjacent channels I and II respectively utilized for the alternate transmission of the first subcarrier $S_B$ and the second subcarrier $S_R$, the luminance signal components being eliminated from the channel utilized for the particular subcarrier which is in the course of transmission. On reception, that part of the luminance signal, $Y_{h1}$ or $Y_{h2}$, transmitted through said top part, is repeated in the same delay line as the subcarriers.

2 Claims, 4 Drawing Figures

TRANSMITTER AND RECEIVER CIRCUITS FOR THE SEQUENTIAL STORAGE COLOR TELEVISION SYSTEM

The present invention relates to an improvement in the transmitter circuit forming the video frequency colour television signal, generally referred to as the "encoder" circuit in the storage sequential colour television system, and to a corresponding improvement in the receiver circuit, generally referred to as the "decoder circuit", receiving this signal.

It will be recalled that the aforesaid colour television system is characterized by the permanent transmission of a luminance signal and the alternate transmission, at the line frequency, of a first subcarrier modulated by a first colour signal and of a second subcarrier modulated by a second colour signal. The colour information is repeated, at the receiving end, preferably at subcarrier frequency, by means of a delay device imparting a delay equal to one like duration.

The object of the present invention is to obtain a better luminance signal in colour television receivers, by employing, in the aforesaid transmitter circuit, a type of encoding which makes it possible to avoid or considerably reduce cross modulation between the luminance signal and the colour subcarrier being transmitted.

As those skilled in the art will be aware, a colour subcarrier has a statistically high-energy spectral zone. In the case of frequency modulation, this zone corresponds to the frequency swing. In the case of double side-band amplitude modulation, the separation is not such a clear one but statistically the energy decreases to either side of the carrier.

The principle of the present invention consists in delimiting two adjacent channels in the top part of the spectrum allotted to the complete video signal, in utilising these channels alternately for the transmission of the colour subcarrier, at least as concerns that part thereof which would be really disturbing from the point of view of cross-modulation, the spectral components of the luminance signal being eliminated from the channel thus utilised for that subcarrier which is in the course of transmission, but being transmitted complete in the other channel. At the receiving end, the components of the luminance signal thus alternately transmitted are repeated at the same time as the colour information in the delay device.

In this way, an excellent luminance signal is obtained in colour receivers. The system remains compatible since the eye of the viewer, in the case of a monochromatic receiver, will effect integration over two successive lines and, ultimately, there will be no more subcarrier energy in the averaged colour television signal than there is in the case of the SECAM system in its current form.

According to the invention, there is provided a colour television transmitter circuit for deriving a colour television signal from a luminance signal and first and second colour signals, said circuit comprising:

switching and filtering means for alternately substantially eliminating from said luminance signal (i) the components thereof lying in a first channel (ii) the components thereof lying in a second channel, said first and second channels being adjacent channels occupying the upper portion of the frequency band alloted to said colour television signal, the alternation occurring at the line frequency;

subcarrier generating means for alternately delivering (i) a first subcarrier modulated by said first colour signal and (ii) a second subcarrier modulated by said second colour signal, at least a substantial portion of the frequency spectrum of said first subcarrier lying in said first channel, and a second subcarrier modulated by said second colour signal, at least a substantial portion of the frequency spectrum of said second subcarrier lying in said second channel, the alternation occurring at the line frequency so that said first or second subcarrier is delivered by said subcarrier generating circuit according to whether said switching and filtering means substantially eliminate those components of the luminance signal which lie in said first channel or in said second channel;

and adding means for adding the output luminance signal from said switching and filtering means to the output subcarrier from said subcarrier generating circuit.

According to the invention there is further provided a colour television receiver circuit for a receiver adapted for co-operating with a transmitter transmitting a colour television signal including a luminance signal and alternately a first subcarrier modulated by a first colour signal and a second subcarrier modulated by a second colour signal, the alternation occurring at the line frequency, at least a substantial portion of the frequency spectrum of said first subcarrier lying in a first channel, which is substantially deprived of luminance components when said first subcarrier is in the course of transmission, and at least a substantial portion of the frequency spectrum of said second subcarrier lying in a second channel which is substantially deprived of luminance components when said second subcarrier is in the course of transmission; said first and second channels occupying adjacent frequency bands located in the upper portion of the frequency band of said colour television signal; said receiver circuit having an input for receiving said colour television signal, a luminance output, a first subcarrier output, and a second subcarrier output, and comprising: first switching and filtering means, coupled to said input of said receiver circuit, for substantially eliminating from said colour television signal those component thereof which lie in said first channel or in said second channel according to whether said first or said second subcarrier is included in the colour television signal being received; an adder having a first input coupled for receiving the output signal from said first switching and filtering means, a second input, and an output forming said luminance output; a high-pass filter, having an input coupled to said input of said receiver circuit, said high-pass filter having a passe-band extending over the frequency bands of each one of said subcarriers, a delay device for imparting to the output signal from said high-pass filter a delay equal to one line duration, said high-pass filter and delay device having respective outputs; second switching and filtering means having a first input coupled to said output of said high-pass filter, a second input coupled to said output of said delay device, and outputs respectively coupled to said second input of said adder and to said first and second subcarrier outputs, for alternately, according to whether said first or said second colour subcarrier is included in the colour television signal being received (i) directing to said second input of said adder the components of the output signal from said delay device lying either in said first or in said second channel (ii) directing to said first subcarrier output those components of the output signal from either said high-pass filter or said delay device which lie in the frequency band of said first subcarrier and (iii) directing to said second colour subcarrier output those components of the output signal from either said delay device or said high-pass filter which lie in the frequency band of said second subcarrier.

It will be realised that the proposed measure is to be distinguished from that adopted in the current SECAM systems where, for the purposes of optimum utilisation of the single subcarrier channel, the subcarrier resting frequencies respectively used for the two colour signals are offset from one another by around 156 kc/s.

The invention will be better understood from a consideration of the following description and the related drawings in which.

The invention will be described in relation to an example which, disregarding the value of the resting frequencies of the subcarriers and the bandwidth of the transmitted side bands, retains the method of transmission of colour information employed in the current French SECAM system.

Figure 1:
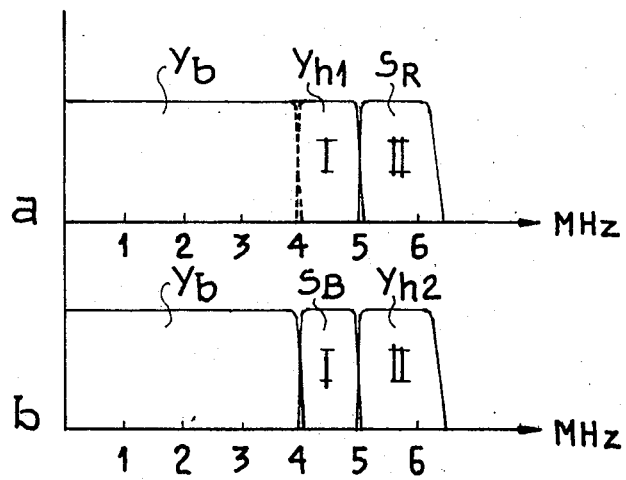
FIG. 1 is an example of a diagram of the spectra of the colour television signal delivered by a transmitter circuit in accordance with the invention.

In FIG. 1a, the spectrum of the complete video signal has been illustrated, that is to say a substantially flat spectrum up to 6 mc/s dropping to zero at 6.5 mc/s (frequency of the audio subcarrier). It is assumed, in this example, that the frequency bands of the subcarriers do not exceed, respectively, those of the channels I and II respectively.

Two channels are provided in accordance with the invention, one I, from 4 to 5 mc/s and the other, II, from 5 mc/s up to the limit of the available spectrum.

It will be remembered that the frequency swing is the same for both subcarriers of the current SECAM system, and is less than 860 kc/s; such a bandwidth can easily be accommodated in each of these channels.

In the upper channel, used in this example for the red chrominance signal, the lowest instantaneous frequency of the subcarrier will advantageously be substantially equal to 5 mc/s in order to ensure proper transmission of the upper side band, while the highest instantaneous frequency of the subcarrier for the blue chrominance signal, which will then be located in the other channel, will advantageously be placed quite close to said same limit.

In FIG. 1a, which represents the spectrum for a line $n$ in respect of which the subcarrier $S_R$ of the red chrominance signal is transmitted through channel II, the reference $Y_b$ designates the fraction of the luminance signal which is limited by the 4 mc/s frequency, and the reference $Y_{h1}$ the fraction of the luminance signal which is simultaneously transmitted through the channel I.

In FIG. 1b, the spectrum for the line ($n+1$) has been shown, the blue chrominance subcarrier $S_B$ being transmitted at the same time as the top fraction $Y_{h2}$ of the luminance components.

The modifications to be made to a current SECAM system encoder circuit in order to implement the invention, will now be discussed.

An arrangement 1 of known type delivers the luminance signal at its output 2, and the two pre-emphasised chrominance signals at its outputs 3 and 4, while a switching signal source 5 delivers the switching signal C, produced at half the line frequency, determining which of the two chrominance signals is to be transmitted.

By means a switch 6 operated at the line frequency by the signal C, the output 2 is alternately connected to a low-pass filter 7 having a cut-off frequency of 5 mc/s, and to a band-stop filter 8 which cuts the band from 4 to 5 mc/s.

The outputs of the two filters are connected to the first input of an adder 9.

The outputs 3 and 4 of the arrangement 1 supply a circuit 10 generating the modulated subcarriers, this circuit differing from that of the current SECAM system in two respects only. The first of these is the choice of the resting frequencies $F'_{oR}$ and $F'_{oB}$ of the red and blue chrominance subcarriers, replacing the current frequencies but still equal to multiples of the line frequency. The second is the filtering. Two high-frequency pre-emphasis filters have to be used to replace the single filter ordinarily provided. For each subcarrier, the pre-emphasis characteristic may for example, at least as far as the instantaneous frequency range is concerned, reproduce that of the single filter of the current SECAM system, with a frequency shift equal to the difference between the utilized resting frequency and that of the current SECAM system; however, advantage could be taken of the situation to use pre-emphasis filters adapted in an optimum way to each subcarrier.

The circuit 10 is also supplied with the signal C which determines which of the subcarriers shall appear at its output with each line period, which output is connected to the second input of the adder 9. The switch of the circuit 10 and the switch 9 of course operate so that the luminance signal is deprived of components in the frequency band utilised for the transmission of the subcarrier delivered by the circuit 10.

The output of the adder 9 supplies the conventional circuits used to add the sync. signals etc.

Figure 3:
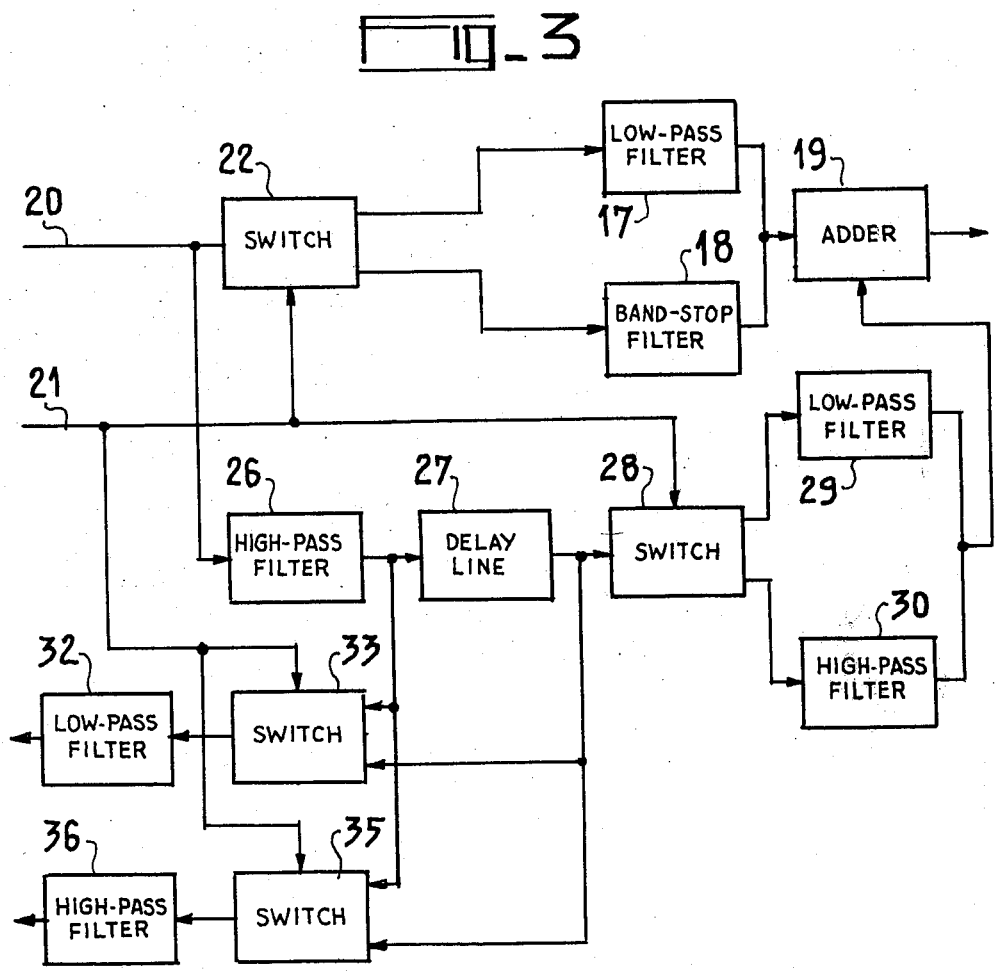

FIG. 3 illustrates the decoder circuit of a corresponding receiver.

There, again, only the modified portions have been illustrated.

To the input 20 there is supplied the signal resulting from the detection of the carrier and to the input 21 one of the switching signals D obtained in the conventional way in order to control, in the current SECAM receivers, the double switch directing the direct and delayed modulated chrominance signals to the corresponding demodulators.

Figure 2:
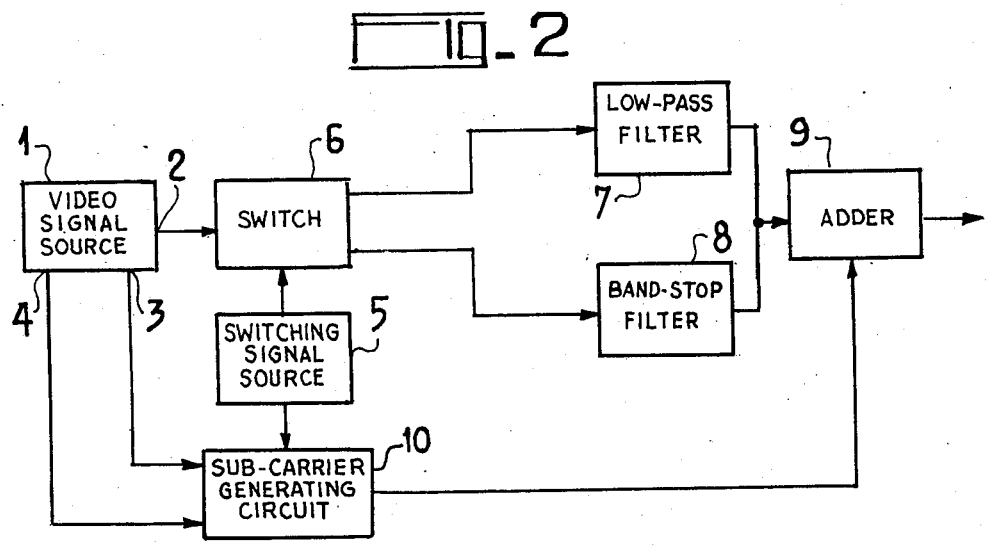
FIGS. 2 and 3 are diagrams of the corresponding modifications made in the transmitters and receivers of the current SECAM system.

The input 20 is connected by a switch 22, controlled by the signal D, to the inputs of a stop band filter 18 identical to that 8 of the encoder shown in FIG. 2, and of a high-pass filter 17 which is identical to the filter 7 of the encoder, one or the other of these filters operating alternately in order to suppress the components of the colour television signal lying in the channel containing no luminance signal components. The outputs of the two filters are connected to the input of an adder 19.

The input 20 supplies on the one hand a high-pass filter 26 whose cut-off frequency is 4 mc/s and whose output is connected to a delay line 27 used to delay the modulated subcarrier $S_R$ or $S_B$ by one line at the same time as the transmitted fraction $Y_{h1}$ or $Y_{h2}$ of the higher frequencies of the luminance signal.

The output of the delay line 27 is connected to a switch 28 whose two outputs are respectively connected to a low-pass filter 29 and to a high-pass filter 30 having the same cut-off frequency, namely 5 mc/s. The switch 28 is operated by the signal D in order to direct the output signal from the delay line to that of the two filters which will let through the higher luminance components, $Y_{h1}$ or $Y_{h2}$, included in the output signal from the delay line. The two filters 29 and 30 have their outputs connected to the second input of the adder 19 which thus delivers a complete luminance signal although one in which part of the higher frequencies corresponds to the preceding line in the field.

The delay line 27 and the high-pass filter 26 alternately supply a low-pass filter 32 whose cut-off frequency is 5 mc/s, through a switch 33 controlled by the signal D.

Similarly, the delay line 27 and the high-pass filter 26 alternately supply a high-pass filter 36 having a cut-off frequency of 5 mc/s, through a switch 35 operated by the signal D.

If the switches are correctly controlled, the low-pass filter 32 will alternately pick off from the output signal delivered by the delay line 27 and from that that delivered by the high-pass filter 26, the subcarrier $S_B$, while the high-pass filter 36 delivers the subcarrier $S_R$ in a similar way. The filters 32 and 36 can be combined with the subcarrier frequency pre-emphasis filters or can be followed by such filters.

The invention is of course open to numerous variant embodiments, in particular where the method of modulating the subcarrier, and the widths of the channels I and II, are concerned. It will be observed that, the various filters being designed accordingly as concerns the channels and subcarrier bandwidths, the two subcarriers may be given bandwidths slightly exceeding those of the channels I and II respectively; what is important is that the main part of the energy of each subcarrier be concentrated, at least statistically, in the channel, I or II, from which the luminance components are eliminated when the considered subcarrier is being transmitted.

It is equally possible of course, to utilise other colour signals, in particular the I and Q signals of the NTSC system.

Figure 4:
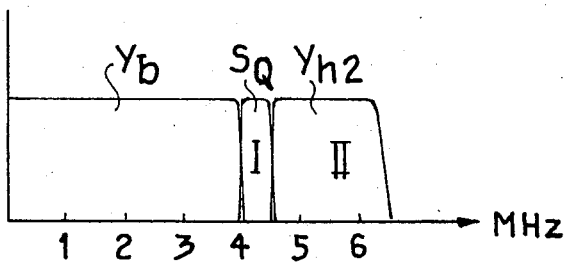
FIG. 4 is a variant embodiment of the diagram shown in FIG. 1.

The diagram of FIG. 4 illustrates a corresponding spectrum for the case in which modulation is of vestigial side band kind, the signal Q being limited to 500 kc/s and the signal I to 1300 kc/s, with vestigial side bands of 100 kc/s in both cases. This spectrum is represented at the time of transmission of the subcarrier $S_Q$ modulated by Q, with the 600 kc/s channel I, from 4 kc/s to 4.6 kc/s and the channel II from 4.6 mc/s to 6 mc/s.

Finally, it should be pointed out that it is entirely permissible to combine the higher frequencies of the luminance signal in two successive lines, in view of the fact that if these frequencies exist at all they correspond, for 90% of the time, to wave fronts which are vertical or are inclined very little away from the vertical and are repeated over a large number of lines. As soon as the transitions become inclined in relation to the vertical, they give rise to lower and lower frequencies which are transmitted in full from one line to the next, with all the quality which interlacing guarantees.

Of course, the term "subcarrier" conventionally used for designating the modulated colour signal does not exclude the case where the colour television signal is intended for transmission at video frequency by cable, without a carrier.

Of course the invention is not limited to the embodiments described and shown which were given solely by way of example.

What is claimed is:

1. A colour television transmitter circuit for deriving a colour television signal from a luminance signal and first and second colour signals, said circuit comprising:
    switching and filtering means for alternately substantially eliminating from said luminance signal (i) the components thereof lying in a first channel (ii) the components thereof lying in a second channel, said first and second channels being adjacent channels occupying the upper portion of the frequency band allotted to said colour television signal, the alternation occurring at the line frequency;
    subcarrier generating means for alternately delivering (i) a first subcarrier modulated by said first colour signal and (ii) a second subcarrier modulated by said second colour signal, at least a substantial portion of the frequency spectrum of said first subcarrier lying in said first channel, and a second subcarrier modulated by said second colour signal, at least a substantial portion of the frequency spectrum of said second subcarrier lying in said second channel, the alternation occurring at the line frequency so that said first or second subcarrier is delivered by said subcarrier generating circuit according to whether said switching and filtering means substantially eliminate those components of the luminance signal which lie in said first channel or in said second channel; and
    adding means for adding the output luminance signal from said switching and filtering means to the output subcarrier from said subcarrier generating circuit.

2. A colour television receiver circuit for a receiver adapted for co-operating with a transmitter transmitting a colour television including a luminance signal and alternately a first subcarrier modulated by a first colour signal and a second subcarrier modulated by a second colour signal, the alternation occurring at the line frequency, at least a substantial portion of the frequency spectrum of said first subcarrier lying in a first channel, which is substantially deprived of luminance components when said first subcarrier is in the course of transmission, and at least a substantial portion of the frequency spectrum of said second subcarrier lying in a second channel which is substantially deprived of luminance components when said second subcarrier is in the course of transmission: said first and second channels occupying adjacent frequency bands located in the upper portion of the frequency band of said colour television signal; said receiver circuit having an input for receiving said colour television signal, a luminance output, a first subcarrier output, and a second subcarrier output, and comprising: first switching and filtering means coupled to said input of said receiver circuit, for substantially eliminating from said colour television signal those component thereof which lie in said first channel or said second channel according to whether said first or said second subcarrier is included in the colour television signal being received; an adder having a first input coupled for receiving the output signal from said first switching and filtering means, a second input, and an output forming said luminance output; a high-pass filter, having an input coupled to said input of said receiver circuit, said high-pass filter having a pass-band extending over the frequency bands of each one of said subcarriers, a delay device for imparting to the output signal from said high-pass filter a delay equal to one line duration, said high-pass filter and delay device having respective outputs; second switching and filtering means having a first input coupled to said output of said high-pass filter, a second input coupled to said output of said delay device, and outputs respectively coupled to said second input of said adder and to said first and second subcarrier outputs, for alternately, according to whether said first or said second colour subcarrier is included in the colour television signal being received (i) directing to said second input of said adder the components of the output signal from said delay device lying either in said first or in said second channel (ii) directing to said first subcarrier output those components of the output signal from either said high-pass filter or said delay device which lie in the frequency band of said first subcarrier and (iii) directing to said second colour subcarrier output those components of the output signal from either said delay device or said high-pass filter which lie in the frequency band of said second subcarrier.

* * * * *